C. E. LEPAGE.
HOSE COUPLING.
APPLICATION FILED JAN. 2, 1907.
909,003.
Patented Jan. 5, 1909.
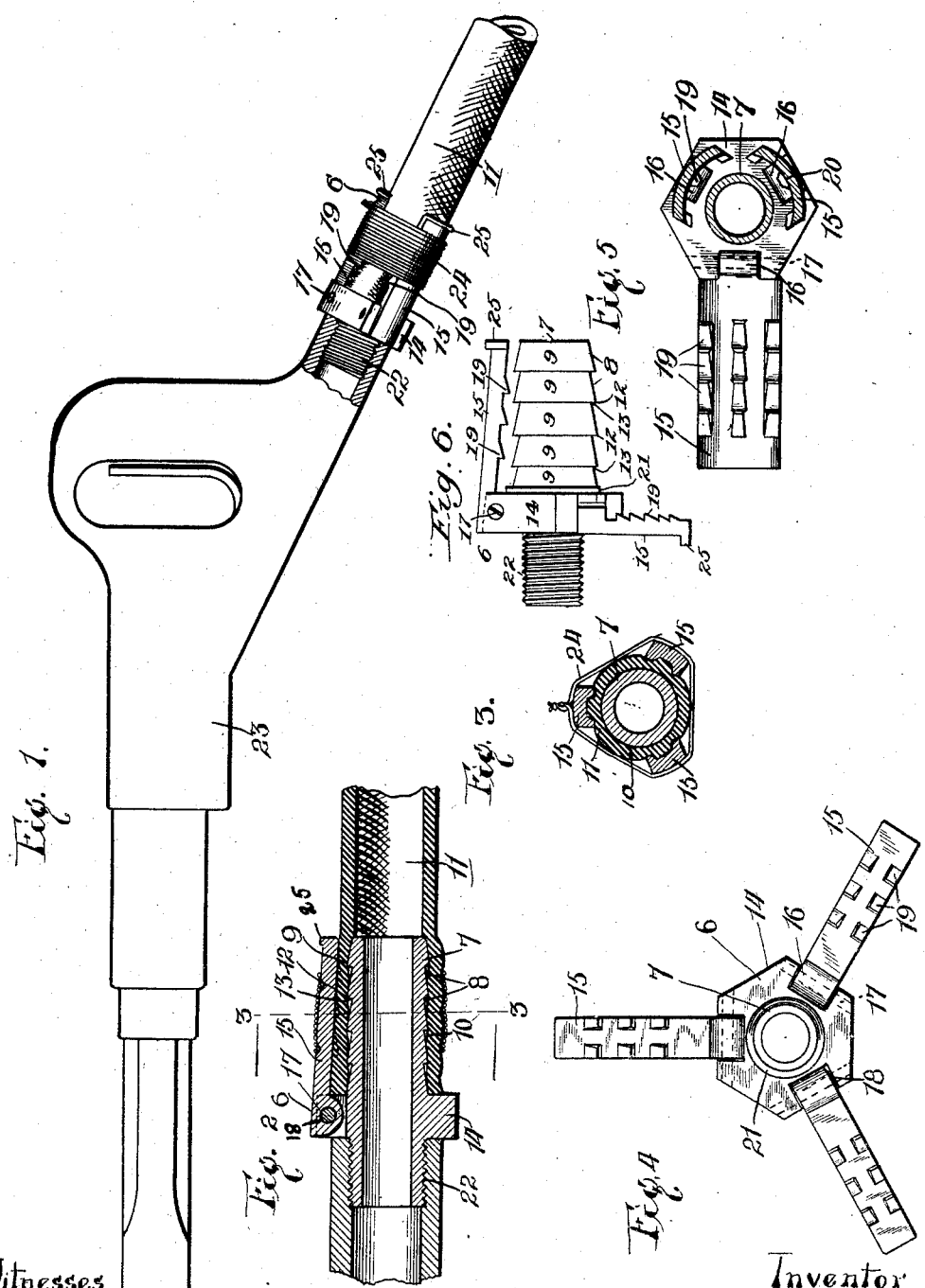

UNITED STATES PATENT OFFICE.

CHARLES E. LEPAGE, OF CHICAGO, ILLINOIS.

HOSE-COUPLING.

No. 909,003.　　　　Specification of Letters Patent.　　　Patented Jan. 5, 1909.

Application filed January 2, 1907. Serial No. 350,405.

*To all whom it may concern:*

Be it known that I, CHARLES E. LEPAGE, a citizen of the United States, residing at Chicago, in the county of Cook and State of Illinois, have invented certain new and useful Improvements in Hose-Couplings, of which the following is a specification.

My invention relates generally to couplings of the class that are capable of being used in connection with hose, and is especially intended to be utilized where it is necessary to maintain a high degree of fluid or other pressure.

In practically all the hose couplings now in use, objection is had thereto by reason of the fact that the coupling will work itself clear from its connection, thus often causing considerable annoyance, damage and delay; and it is the object of my present invention to so construct the coupling as a whole that when the hose is inserted and secured in operative position it will be absolutely impossible of displacement.

In the drawings illustrating the invention, Figure 1 is a side elevation of my coupling as secured to a hose and instrument respectively; Fig. 2 a longitudinal sectional elevation showing the device in use; Fig. 3 a transverse section taken on line 3—3 of Fig. 2 looking in the direction of the arrow; Fig. 4 a top or plan view of the coupling with the arms retracted, showing one style of forming the arms; Fig. 5 a top or plan view with one of the arms retracted, showing a slightly modified form of arm; and Fig. 6 a side elevation of the coupling, showing one of the clamping arms down and another clamping arm raised.

The hose coupling 6 of my present invention can be made of any suitable metal or material, and is so constructed that the various parts can be cast and assembled together with considerable facility. My coupling 6 consists primarily of an elongated rounded nipple portion 7 having on its exterior surface a series of corrugations 8 extending circumferentially around and longitudinally of the nipple, as shown in Fig. 6, and forming in effect a plurality of abrupt or sharp shoulders or bearing surfaces 9 for the purpose of impinging the interior surface 10 of the hose 11 as shown in Fig. 2. These inclined or corrugated surfaces on the elongated rounded nipple 7 are inclined from front to rear and have their enlarged portions adjacent to the ridge or shoulder 12, and their smaller portions at the bottom thereof as at 13. In connection with this elongated rounded nipple portion 7 is cast or secured a nut 14 which, for practical purposes, I prefer to be of hexagonal formation. This nut 14 has secured thereto a plurality of arms 15 which are preferably pivotally mounted thereon within the recesses 16 by means of pins or pintles 17 suitably passed through the face of the nut and through the heads 18 on the inner ends of the arms 15, as best shown in Fig. 4.

Each clamping arm 15 has on its inner face a series of teeth 19, which, as shown in Fig. 4, are located adjacent to each side edge of the arm. The teeth 19, on each arm, coact with the corrugations on the nipple to compress the end of the hose between the teeth and the corrugations, and for this purpose the teeth are each formed with an inclined bearing face, the inclination of which is in the opposite direction to the inclination of the bearing face of the corrugation, and the teeth are so located on the arms as to lie midway between the series of corrugations on the nipple, as clearly shown in Fig. 6, by which arrangement an in and out compression is exerted on the hose, when clamped between the arms and around the nipple, which insures a close, tight and perfect series of packings, which will effectually prevent the escape of a medium under pressure between the nipple and the hose. The arms 15 as thus arranged are capable of being easily swung back and forth, as desired, and, when positioned against the hose when a coupling is effected, the teeth 19 thereon will bite into and impinge against the exterior surface of the hose, as shown in Fig. 2. These arms can be of any suitable shape and number, depending, however, somewhat upon the uses and purposes to which it will be put.

While the arms may be formed with a flat surface, as shown in Fig. 4, I desire in some cases where high pressure is utilized, to so shape the same that they will, in whole or in part, inclose the hose upon the nipple; and this is in effect done by giving a rounded contour 20 thereto, as shown in Fig. 5. In case these turned arms are proportioned so as to cover practically the entire exterior surface of the secured end of a hose, I insert thereon a supplemental series of teeth, thus giving a larger gripping surface to the arms. The nipple can extend beyond, up to, or within the arms, terminating preferably in a boss 21 adjacent to the nut, which effectually renders the end of the hose air tight. On the outer face of the nut and cast therewith is a screw-threaded member 22 for effecting connections with a hammer or instrument 23, as shown.

In use, one end of the hose 11 is inserted onto the nipple portion of the coupling, so that its end will abut against the boss 21. The arms 15 are thrown into position so that the teeth 19 thereon will firmly bite into and impinge against the exterior surface of the hose. Suitable binding means, such as clasps or wire, are then inserted over and about the arms, the same being prevented from slipping or working their way off by reason of a ridge 25 on the end of the arms.

From the foregoing description it will be seen that my coupling is so peculiarly constructed and arranged that the interior surface of the hose, as well as the exterior thereof, is held firmly in place when positioned, and that it is absolutely impossible to withdraw the hose from the coupling until the binding means have been first unfastened.

What I claim as new and desire to secure by Letters Patent is:

1. In a coupling, the combination of a nipple having on its exterior a series of circumferential corrugations, each corrugation having an inclined bearing face and a straight end face for entering and engaging with the end of a hose, a plurality of pivotally connected arms mounted on the nipple at its forward end, each arm adapted to longitudinally overlie the exterior surface of the hose end of the nipple, each arm having on its interior face a series of longitudinal teeth, each tooth having an inclined bearing face oppositely inclined to the bearing face of the companion corrugation and a straight end face, the corrugations of the nipple and the teeth of the arms alternating with each other on opposite sides of the hose end, and means for forcing the arms inwardly and alternately clamping the hose end between the corrugations of the nipple and the teeth of the arms, substantially as described.

2. In a coupling, the combination of a nipple having a corrugated exterior said corrugations comprising inclined longitudinal bearing faces and straight end faces, and adapted to engage the interior surface of a hose end, and a plurality of arms adapted to be clamped about the hose end and pivotally mounted on the nipple, each arm having on its interior a series of teeth, each tooth having an inclined longitudinal bearing face and a straight end face, the corrugations and teeth oppositely inclined and furnishing in use alternating shoulders engaging the interior and exterior respectively of the hose end for tightly clamping the coupling on the hose end against leakage, substantially as described.

3. In a hose coupling, a member comprising a circumferential flange, a threaded attaching nipple on one side of the flange and a corrugated nipple on the opposite side of the flange, the corrugations extending circumferentially around and longitudinally of the nipple and each corrugation having a longitudinal bearing face and an end cross face, and a plurality of arms, each arm pivotally connected to the flange and in use extending longitudinally of the corrugated nipple and each arm having on its interior face a series of teeth, each tooth having a longitudinal bearing face and an end cross face, the teeth of the arms and the corrugations of the nipple alternating in engaging respectively the exterior and interior of the hose end, substantially as described.

4. In a hose coupling, a member comprising a circumferential flange, a threaded attaching nipple on one side of the flange and a corrugated nipple on the opposite side of the flange, the corrugations extending circumferentially around and longitudinally of the nipple and each corrugation having a longitudinal bearing face and an end cross face, and a plurality of arms, each arm pivotally connected to the flange and in use extending longitudinally of the corrugated nipple and each arm having on its interior face a series of teeth, each tooth having a longitudinal bearing face and an end cross face, the teeth of the arms and the corrugations of the nipple alternating in engaging respectively the exterior and interior of the hose end, and means for inwardly drawing the arms and forcing the engaging faces of the nipple and arms to alternately press against the interior and exterior of a hose end, substantially as described.

5. In a coupling, the combination of a nipple having a flange at its advanced end and having around its exterior a series of corrugations, each corrugation having an inclined longitudinal bearing face and an engaging end shoulder, a plurality of swinging arms, each arm pivotally mounted on the flange of the nipple and each arm having on its interior a series of teeth, each tooth having an inclined longitudinal bearing face oppositely inclined to the bearing face of the companion corrugation and an engaging end shoulder, the shoulders alternating in use with the shoulders of the corrugations on the nipple and producing a compression midway longitudinally of the bearing faces of those corrugations, and a threaded attaching member forwardly extending from the flange, substantially as described.

6. A hose coupling, comprising a nipple having a series of corrugations around its exterior, each corrugation having an inclined longitudinal bearing face and an inwardly extending shoulder at right angles to the bearing face, and a plurality of swinging arms pivotally mounted on the nipple, each arm having on its interior face a series of teeth, each tooth having an inclined longitudinal bearing face oppositely inclined to the bearing face of the companion corrugation and an inwardly extending shoulder at right angles to the bearing face, with the shoulders of the teeth alternating with the shoulders of the corrugations to engage respectively the exterior and interior face of a hose end and tightly compress the hose end alternately between the corrugations of the nipple and the teeth of the arms, substantially as described.

7. In a hose coupling, a member comprising a flange nut having a periphery composed of flat faces, the alternating faces having recesses and the intermediate walls between the recesses having cross pivot holes, a threaded attaching nipple on one side of the flange nut and a corrugated nipple on the opposite side of the flange nut, the corrugations extending circumferentially around and longitudinal of the nipple, and each corrugation having a longitudinal bearing face and an end cross face, and a member comprising a plurality of clamping jaws, each jaw having at one end a head provided with a pivot hole and adapted to enter a recess of the flange nut, a pivot pin for each jaw entered through the pivot holes of the flange nut and the jaw head, the jaws in use extending longitudinally of the corrugated nipple and each jaw having on its interior face a series of teeth, each tooth having a longitudinal bearing face and an end cross face, the teeth of the jaws and the corrugations of the nipple alternating in engaging respectively the exterior and interior of the hose end, and means for pressing the jaws inwardly to overlie the nipple and clasp the hose end between the corrugations of the nipple and the teeth of the jaws alternately on the interior and exterior of the hose end, substantially as described.

CHARLES E. LEPAGE.

Witnesses:
   WALKER BANNING,
   PIERSON W. BANNING.